United States Patent
Comstock

(10) Patent No.: US 11,044,648 B2
(45) Date of Patent: Jun. 22, 2021

(54) TIMING ADVANCE DETERMINATION BY TARGET BASE STATION FOR RACH-LESS HANDOVER

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 232 days.

(21) Appl. No.: 16/322,224

(22) PCT Filed: Aug. 10, 2017

(86) PCT No.: PCT/US2017/046285
§ 371 (c)(1),
(2) Date: Jan. 31, 2019

(87) PCT Pub. No.: WO2018/031764
PCT Pub. Date: Feb. 15, 2018

(65) Prior Publication Data
US 2019/0174372 A1 Jun. 6, 2019

Related U.S. Application Data

(60) Provisional application No. 62/374,511, filed on Aug. 12, 2016.

(51) Int. Cl.
*H04W 36/00* (2009.01)
*H04W 36/08* (2009.01)
(Continued)

(52) U.S. Cl.
CPC ..... *H04W 36/00837* (2018.08); *H04W 36/00* (2013.01); *H04W 36/0077* (2013.01);
(Continued)

(58) Field of Classification Search
None
See application file for complete search history.

(56) References Cited

U.S. PATENT DOCUMENTS 9,264,961 B1 * 2/2016 Shah ..................... H04W 36/30
2008/0084849 A1 * 4/2008 Wang ................ H04W 56/0045
370/332
(Continued)

OTHER PUBLICATIONS

Qualcomm Incorporated; "Further details of RACH-less handover," R2-164239; 3GPP TSG-RAN WG2 Meeting #94, May 23-27, 2016; Nanjing, CN.
(Continued)

*Primary Examiner* — Bob A Phunkulh

(57) ABSTRACT

RACH-less handovers can be used to reduce the additional time required to complete the RACH procedure when the Timing Advance (TA) must be determined as part of the handover procedure. In order to facilitate a RACH-less handover, the source base station informs the target base station of a radio transmission configuration that will be used by the UE device to transmit uplink signals to the source base station, and the source base station configures the UE device in accordance with the radio transmission configuration. The UE device transmits uplink signals to the source base station using the specified radio transmission configuration, and the target base station receives the uplink signals. The UE device transmits these uplink signals to the source base station before the handover procedure is initiated. The target base station calculates the TA, based on the uplink signals, which can be signaled to the UE device in a handover command.

17 Claims, 4 Drawing Sheets

(51) Int. Cl.
*H04W 56/00* (2009.01)
*H04W 88/08* (2009.01)

(52) U.S. Cl.
CPC ......... *H04W 36/08* (2013.01); *H04W 56/005* (2013.01); *H04W 88/08* (2013.01)

(56) References Cited

U.S. PATENT DOCUMENTS

| | | |
|---|---|---|
| 2008/0182579 A1 | 7/2008 | Wang et al. |
| 2008/0267127 A1* | 10/2008 | Narasimha ........ H04W 36/0072 370/331 |
| 2008/0267131 A1 | 10/2008 | Kangude et al. |
| 2008/0268850 A1* | 10/2008 | Narasimha ........ H04W 36/0072 455/437 |
| 2009/0191874 A1* | 7/2009 | Du ...................... H04W 36/18 455/436 |
| 2010/0240375 A1 | 9/2010 | Ahluwalia |
| 2016/0192261 A1 | 6/2016 | Wang et al. |
| 2016/0381611 A1* | 12/2016 | Uchino ............. H04W 36/0061 370/331 |

OTHER PUBLICATIONS

Kyocera Corp; "Preamble-based solution for CA_HetNet_ICIC macro-pico UL interference scenario," R2-120663; 3GPP TSG-RAN WG3 Meeting #75bis; Mar. 26-30, 2012; San Jose del Cabo, MX.

\* cited by examiner

TIMING ADVANCE DETERMINATION BY TARGET BASE STATION FOR RACH-LESS HANDOVER

CLAIM OF PRIORITY

The present application claims priority to Provisional Application No. 62/374,511, entitled "TIMING ADVANCE DETERMINATION BY TARGET ENB FOR RACH-LESS HANDOVER", filed Aug. 12, 2016, assigned to the assignee hereof and hereby expressly incorporated by reference in its entirety.

FIELD

This invention generally relates to wireless communications and more particularly to the handover of user equipment devices between base stations.

BACKGROUND

In conventional systems, a handover of a user equipment (UE) device from a source base station (e.g., source eNB) to a target base station (e.g., target eNB) involves the source base station transmitting a Handover Request message to the target base station (e.g., to initiate a handover) and the target base station transmitting a message in response. The source base station signals target base station uplink resources to the UE device, which utilizes the uplink resources for a Random-Access Channel (RACH) procedure. After the UE device is handed over to the target base station, the UE device transmits an uplink signal to the target base station as part of the RACH procedure. The target base station uses the uplink signal received from the UE device to calculate a Timing Advance (TA), which is needed in order for the UE device's uplink transmissions to be synchronized to the target base station after handover. The target base station signals the TA, along with other resources needed for the UE device to obtain uplink access to the target base station as part of the RACH procedure.

SUMMARY

RACH-less handovers can be used to reduce the additional time required to complete the RACH procedure when the Timing Advance (TA) must be determined as part of the handover procedure. In order to facilitate a RACH-less handover, the source base station informs the target base station of a radio transmission configuration that will be used by the UE device to transmit uplink signals to the source base station, and the source base station configures the UE device in accordance with the radio transmission configuration. The UE device transmits uplink signals to the source base station using the specified radio transmission configuration, and the target base station receives the uplink signals. The UE device transmits these uplink signals to the source base station before the handover procedure is initiated. The target base station calculates the TA, based on the uplink signals, which can be signaled to the UE device in a handover command.

DETAILED DESCRIPTION

One drawback of conventional systems is that the TA determination step is performed after the handover procedure has already been initiated, which unnecessarily increases the amount of time required to complete the handover procedure. As will be described more fully below, RACH-less handovers can be used to reduce the additional time required to complete the RACH procedure when the TA must be calculated as part of the handover procedure. As used herein, the term "RACH-less handover" refers to skipping the transmission of the Random-Access Channel (RACH) by the user equipment (UE) device to the target base station (e.g., target eNB) during handover, which significantly improves the delay for the handover procedure since the RACH procedure is a substantial part of the handover delay. One main aspect of the RACH-less handover, according to the invention, is that the UE obtains the Timing Advance (TA) associated with the target base station before the handover procedure is initiated, rather than having the target base station calculate the TA based on uplink RACH transmissions after the handover has been initiated.

In order to effect a RACH-less handover, according to the invention, the source base station informs the target base station of a radio transmission configuration that will be used by the UE device to transmit signals on the uplink that are to be received by the target base station, and the source base station configures the UE device in accordance with the radio transmission configuration. The configuration of the UE device and transmission for these uplink signals occurs before the handover procedure is initiated. The source base station can begin the UE device configuration process, based on any suitable criteria (e.g., measurement reports from the source base station, the target base station, the UE device) that indicate that the UE device can/should be handed over to another base station. Upon receipt of the uplink signals from the UE device, the target base station calculates the TA, which is signaled to the UE device in a handover command.

Figure 1:
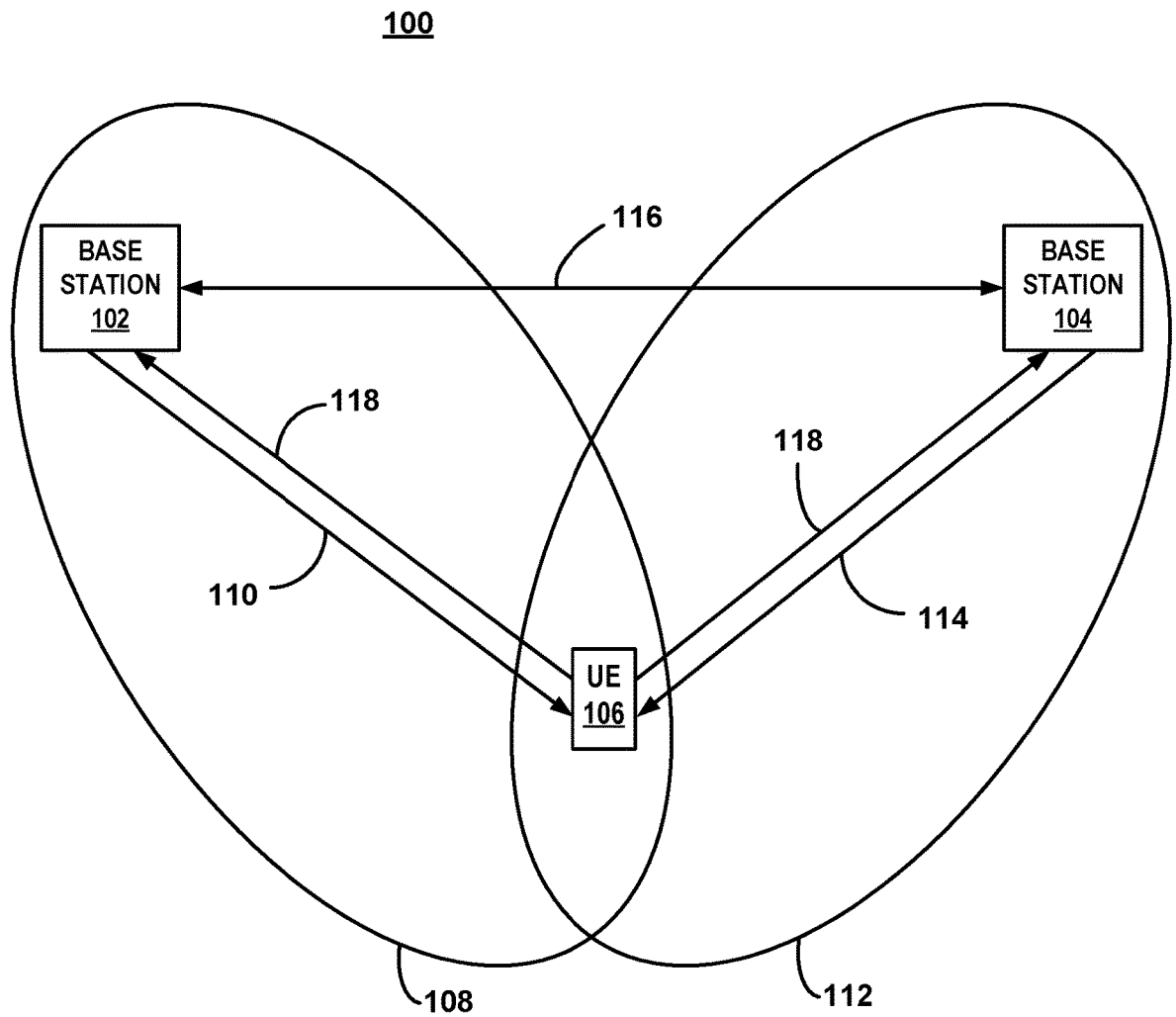
FIG. 1 is a block diagram of a communication system for an example in which a handover of a UE device from a source base station to a target base station is initiated after determining a timing difference between the target base station and the UE device.

FIG. 1 is a block diagram of a communication system for an example in which a handover of a UE device from a source base station to a target base station is initiated after determining a timing difference between the target base station and the UE device. The communication system 100 is part of a radio access network (not shown) that provides various wireless services to UE devices that are located within the respective service areas of the various base stations that are part of the radio access network.

In the interest of clarity and brevity, communication system 100 is shown as having only source base station 102 and target base station 104. However, in other examples, communication system 100 could have any suitable number of base stations. In the example of FIG. 1, at least a portion of the service area for source base station 102 is represented by cell 108, and at least a portion of the service area for target base station 104 is represented by cell 112. Cells 108, 112 are represented by ovals, but a typical communication system 100 would have a plurality of cells, each having variously shaped geographical service areas. Base stations 102, 104, sometimes referred to as eNodeBs or eNBs, communicate with the wireless user equipment (UE) device 106 by respectively transmitting downlink signals 110, 114 to UE device 106. Base stations 102, 104 receive uplink signals 118 transmitted from the UE device 106. The UE device 106 is any wireless communication device such as a mobile phone, a transceiver modem, a personal digital assistant (PDA), or a tablet, for example.

Figure 2A:
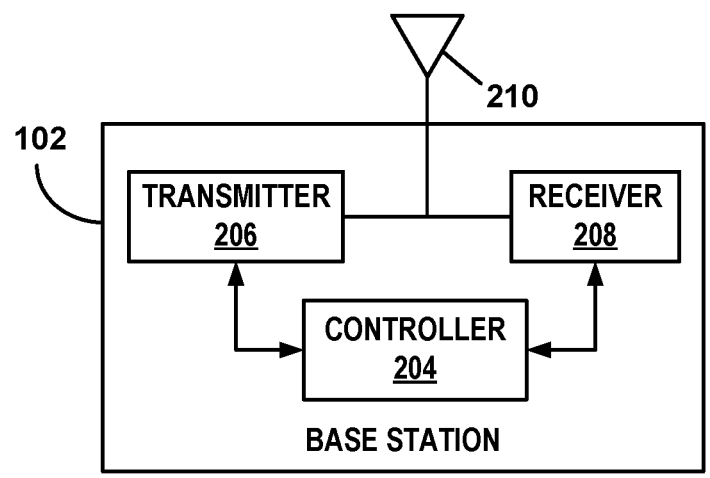
FIG. 2A is a block diagram of an example of the base station shown in FIG. 1.

Base stations 102, 104 are connected to the network through a backhaul (not shown) in accordance with known techniques. As shown in FIG. 2A, source base station 102 comprises controller 204, transmitter 206, and receiver 208, as well as other electronics, hardware, and code. Although FIG. 2A specifically depicts the circuitry and configuration of source base station 102, the same base station circuitry and configuration is utilized for target base station 104 in communication system 100. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 110 and can apply any one of a plurality of modulation orders. The demodulator demodulates any uplink signals 118 received at the base station 102 in accordance with one of a plurality of modulation orders.

Figure 2B:
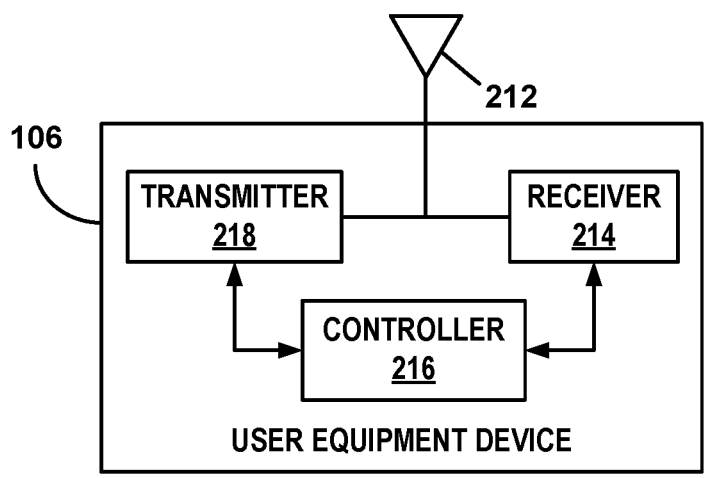
FIG. 2B is a block diagram of an example of the UE device shown in FIG. 1.

Returning to FIG. 1, the communication system 100 provides various wireless services to UE device 106 via base stations 102, 104. For the examples herein, the communication system 100 operates in accordance with at least one revision of the 3rd Generation Partnership Project Long Term Evolution (3GPP LTE) communication specification. UE device 106 is initially served by source base station 102 and, thus, receives downlink signals 110 via antenna 212 and receiver 214, as shown in FIG. 2B. Besides antenna 212 and receiver 214, UE device 106 further comprises controller 216 and transmitter 218, as well as other electronics, hardware, and code. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 118, which are shown in FIG. 1. The demodulator demodulates the downlink signals 110, 114 in accordance with one of a plurality of modulation orders.

At the beginning of operation of the example shown in FIG. 1, the UE device 106 is being served by source base station 102. Thus, upon receipt of the downlink signals 110, the UE device 106 demodulates the downlink signals 110, which yields encoded data packets that contain data pertaining to at least one of the wireless services that the source base station 102 is providing to the UE device 106. The UE device 106 decodes the encoded data packets, using controller 216, to obtain the data.

When any one or more criteria are met for source base station 102 to hand the UE device 106 over to target base station 104, source base station 102 transmits UE device radio transmission configuration information associated with UE device 106 to target base station 104. The criteria may include, for example, radio congestion at source base station 102, poor/deteriorating signal quality for the uplink/downlink signals for UE device 106, and/or underutilization of available resources by target base station 104. However, any other suitable criteria could be used.

Figure 3:
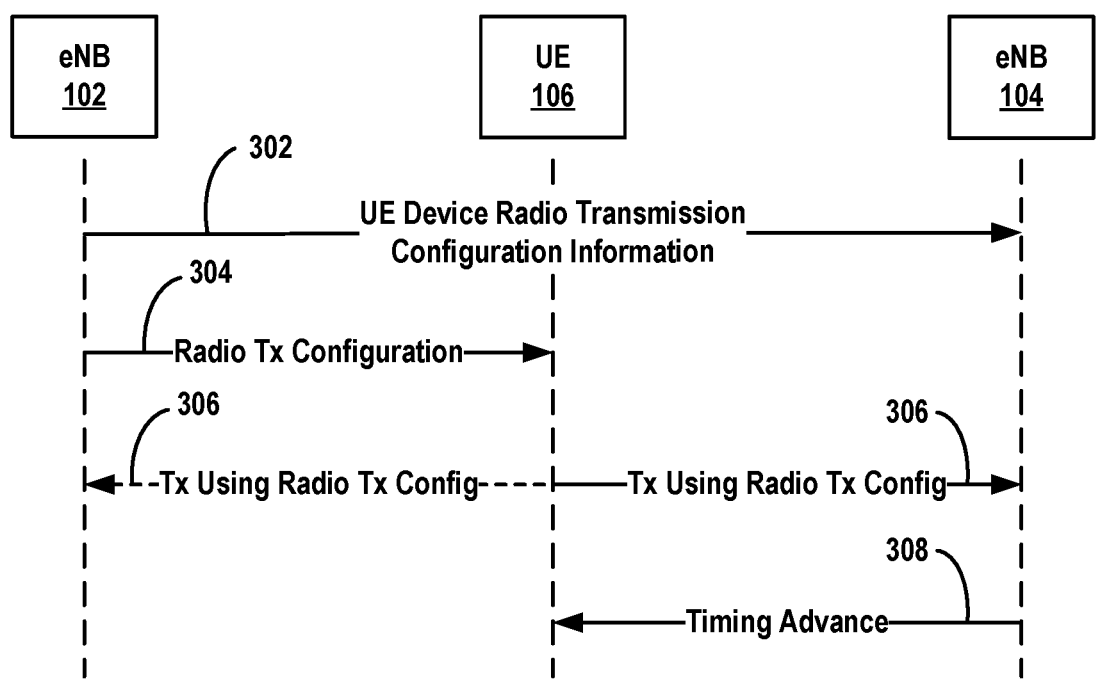
FIG. 3 is a messaging diagram of an example of the messages exchanged between the various system components shown in FIG. 1.

Regardless of the criteria used, the source base station 102 can transmit the UE device radio transmission configuration information to target base station 104 via a wired (e.g., X2) or a wireless communication link. If the transmission is wireless, source base station 102 uses transmitter 206 and antenna 210 to transmit the UE device radio transmission configuration information. Target base station 104 receives the wireless transmission of the UE device radio transmission configuration information via antenna 210 and receiver 208. In some examples, the UE device radio transmission configuration information is transmitted as a Resource Status Request message to the target base station 104. The transmission of the UE device radio transmission configuration information to target base station 104 is represented in FIG. 3 by signal 302.

The UE device radio transmission configuration information informs the target base station 104 of the radio transmission configuration that will be used by the UE device 106 when transmitting the uplink signal 118, which the target base station 104 will use to calculate the Timing Advance for UE device 106. The UE device radio transmission configuration information can include, for example, the preamble assigned to UE device 106 and a subframe identifier identifying a subframe to be used by the UE device 106 for transmitting the assigned preamble as part of the uplink signal 118. The preamble can be chosen from a list of preambles available to source base station 102. Similarly, the subframe can be chosen from subframes available to source base station 102. Of course, any other suitable radio transmission configuration information can be included in the UE device radio transmission configuration information provided to the target base station 104, as well.

The source base station 102 instructs the UE device 106 to transmit the uplink signal 118 and to use the UE device radio transmission configuration that was provided to the target base station 104. More specifically, in the example shown in FIG. 1, the source base station 102 orders the UE device 106 to perform a Random Access procedure using a Physical Downlink Control Channel (PDCCH) Order, which includes a parameter that specifies (1) the preamble to be used by the UE device 106 as part of the uplink signal 118, and (2) the subframe to be used by the UE device 106 for transmitting the assigned preamble as part of the uplink signal 118. In the example shown in FIGS. 1 and 2A, source base station 102 transmits the PDCCH Order to UE device 106 via transmitter 206 and antenna 210. UE device 106 receives the PDCCH Order via antenna 212 and receiver 214. The transmission of the UE device radio transmission configuration to the UE device 106 is represented in FIG. 3 by signal 304.

After receiving the UE device radio transmission configuration, the UE device 106 transmits a first transmission using the UE device radio transmission configuration associated with the UE device radio transmission configuration information that was transmitted to the target base station 104. The UE device 106 transmits the first transmission via transmitter 218 and antenna 212. The first transmission is sent as an uplink signal 118 and received by the target base station 104. The first transmission by the UE device 106 is represented in FIG. 3 by signal 306. In this regard, signal 306 is shown in FIG. 3 as being transmitted to both source base station 102 and target base station 104 since both base stations are capable of receiving signal 306, even though the primary intention is the reception of signal 306 by the target base station 104.

The target base station 104 receives the first transmission via antenna 210 and receiver 208. Upon receipt of the first transmission from the UE device 106, the controller 204 of target base station 104 determines a timing difference between the target base station 104 and the UE device 106, based at least partially on the received first transmission. More specifically, the target base station 104 receives, from the source base station 102, the timing of the first transmission from the UE device 106, and based on the time the target base station 104 receives the first transmission from the UE device 106, the target base station 104 can determine the timing difference between the target base station 104 and the UE device 106.

Once the timing difference has been determined, the controller 204 of target base station 104 determines a Timing Advance (TA) for UE device 106. The TA is based at least partially on the timing difference. As mentioned above, the UE device 106 utilizes the TA to synchronize its uplink transmissions with the target base station 104 after handover. The target base station 104 transmits the TA, using transmitter 206 and antenna 210, to UE device 106. In some examples, the TA is transmitted as part of a Handover Command, which is transmitted to the source base station and subsequently transmitted by the source base station to the UE device. In still other examples, the TA is transmitted during the handover procedure. The transmission of the TA to UE device 106 is represented in FIG. 3 by signal 308.

After the timing difference has been determined, the handover procedure is initiated. In some examples, the controller 204 of source base station 102 initiates the handover from the source base station 102 to the target base station 104, and the controller 204 of the target base station 104 is configured to cooperate with the handover. The fact that the UE device 106 receives the TA to be used with target base station 104 in the Handover Command advantageously expedites the handover procedure since the target base station does not need to measure a RACH transmission from the UE device 106 as part of the handover procedure, as is the case in conventional systems.

Figure 4:
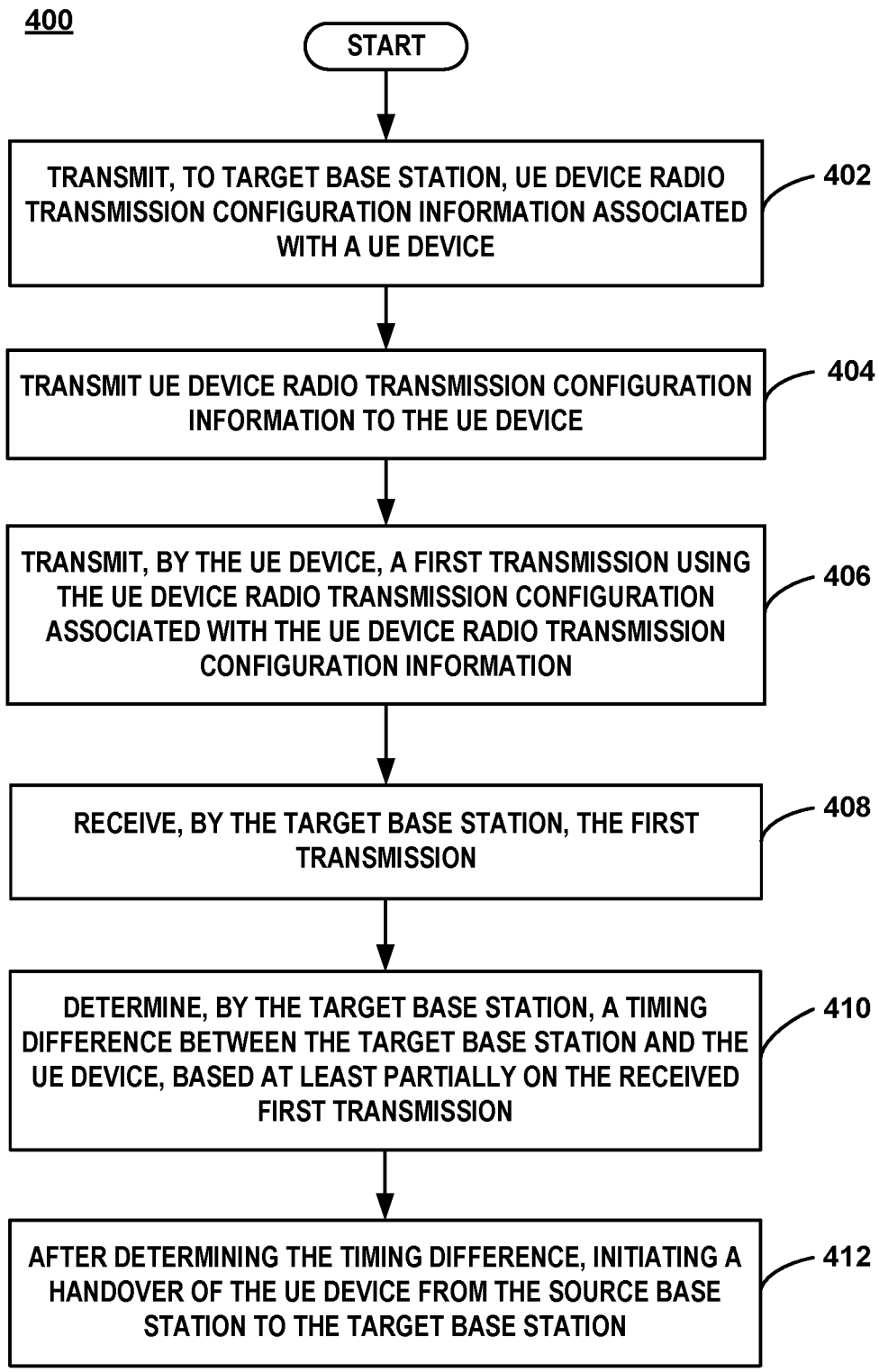
FIG. 4 is a flowchart of an example of a method in which a handover of a UE device from a source base station to a target base station is initiated after determining a timing difference between the target base station and the UE device.

FIG. 4 is a flowchart of an example of a method in which a handover of a UE device from a source base station to a target base station is initiated after determining a timing difference between the target base station and the UE device. The method 400 begins at step 402 with transmitting, to the target base station 104, UE device radio transmission configuration information associated with a UE device. As mentioned above, the UE device radio transmission configuration information can include a preamble assigned to the UE device and a subframe identifier identifying a subframe to be used by the UE device for transmitting the assigned preamble as part of a first transmission.

At step 404, the source base station 102 transmits the UE device radio transmission configuration information to the UE device 106. At step 406, the UE device 106 transmits a first transmission, using the UE device radio configuration associated with the UE device radio transmission configuration information, to the target base station 104. At step 408, the target base station 104 receives the first transmission from the UE device 106.

At step 410, the target base station 104 determines a timing difference between the target base station 104 and the UE device 106, based at least partially on the first transmission received from the UE device 106. At step 412, after determining the timing difference, the source base station 102 initiates a handover of the UE device 106 from the source base station 102 to the target base station 104. Although not shown in the example of FIG. 4, the target base station 104 can also determine a Timing Advance (TA), based at least partially on the timing difference, and can transmit the TA to the UE device 106. The TA can be transmitted as part of the Handover command during the handover procedure.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
receiving, at a target base station, user equipment (UE) device radio transmission configuration information associated with a UE device, the UE device being served by a source base station, wherein the UE device radio transmission configuration information comprises a preamble assigned to the UE device and a subframe identifier identifying a subframe to be used by the UE device for transmitting the assigned preamble as part of a first transmission;
receiving, at the target base station from the UE device, the first transmission using a UE device radio transmission configuration associated with the UE device radio transmission configuration information;
determining, by the target base station, a timing difference between the target base station and the UE device, based at least partially on the received first transmission; and
after determining the timing difference, cooperating, by the target base station, with a handover of the UE device from the source base station to the target base station.

2. The method of claim 1, wherein receiving the first transmission comprises:
receiving, at the target base station from the UE device, a Random-Access Channel (RACH) transmission using the assigned preamble and the subframe identified by the subframe identifier.

3. The method of claim 1, further comprising:
transmitting a Timing Advance from the target base station to the UE device, the Timing Advance based at least partially on the timing difference.

4. The method of claim 3, wherein the Timing Advance is transmitted as part of a Handover Command.

5. The method of claim 3, wherein the Timing Advance is transmitted during the handover.

6. The method of claim 1, wherein receiving, at the target base station, UE device radio transmission configuration information comprises receiving a Resource Status Request message.

7. A base station comprising:
a receiver configured to:
receive user equipment (UE) device radio transmission configuration information associated with a UE device, the UE device being served by another base station, wherein the UE device radio transmission configuration information comprises a preamble assigned to the UE device and a subframe identifier identifying a subframe to be used by the UE device for transmitting the assigned preamble as part of a first transmission, and
receive, from the UE device, the first transmission using a UE device radio transmission configuration associated with the UE device radio transmission configuration information; and
a controller coupled to the receiver, the controller configured to:
determine a timing difference between the base station and the UE device, based at least partially on the received first transmission, and
cooperate with a handover of the UE device from the another base station to the base station, the handover initiated by the another base station after the timing difference has been determined.

8. The base station of claim 7, wherein the first transmission comprises:
a Random-Access Channel (RACH) transmission that is transmitted using the assigned preamble and the subframe identified by the subframe identifier.

9. The base station of claim 7, further comprising:
a transmitter coupled to the controller, the transmitter configured to transmit a Timing Advance to the UE device, the Timing Advance based at least partially on the timing difference.

10. The base station of claim 9, wherein the transmitter is further configured to transmit the Timing Advance as part of a Handover Command.

11. The base station of claim 9, wherein the transmitter is further configured to transmit the Timing Advance during the handover.

12. A system comprising:
a user equipment (UE) device;
a source base station serving the UE device, the source base station comprising:
a transmitter configured to transmit UE device radio transmission configuration information associated with the UE device, wherein the UE device radio transmission configuration information comprises a preamble assigned to the UE device and a subframe identifier identifying a subframe to be used by the UE device for transmitting the assigned preamble as part of a first transmission, and
a controller configured to initiate a handover of the UE device from the source base station to the target base station; and
a target base station comprising:
a receiver configured to:
receive the UE device radio transmission configuration information, and receive, from the UE device, the first transmission using a UE device radio transmission configuration associated with the UE device radio transmission configuration information, and a controller coupled to the receiver, the controller configured to:

determine a timing difference between the target base station and the UE device, based at least partially on the received first transmission, and cooperate with the handover of the UE device from the source base station to the target base station, the handover initiated by the source base station after the timing difference has been determined.

13. The system of claim 12, wherein the transmitter of the source base station is further configured to transmit the UE device radio transmission configuration information as a Resource Status Request message.

14. The system of claim 12, wherein the first transmission comprises:

a Random-Access Channel (RACH) transmission that is transmitted using the assigned preamble and the subframe identified by the subframe identifier.

15. The system of claim 12, wherein the target base station further comprises:

a transmitter coupled to the controller, the transmitter configured to transmit a Timing Advance to the UE device, the Timing Advance based at least partially on the timing difference.

16. The system of claim 15, wherein the transmitter of the target base station is further configured to transmit the Timing Advance as part of a Handover Command.

17. The system of claim 15, wherein the transmitter of the target base station is further configured to transmit the Timing Advance during the handover.

* * * * *